(No Model.) 3 Sheets—Sheet 1.

M. T. BARTELT, C. GOLLE & G. STEIN.
SHUTTLE PICKING MECHANISM FOR LOOMS.

No. 524,571. Patented Aug. 14, 1894.

WITNESSES
F. D. Goodwin
William X. Barr

INVENTORS
Morris T. Bartelt
Charles Golle
Gustave Stein
By their Attorneys
Howson & Howson (No Model.) 3 Sheets—Sheet 2.

M. T. BARTELT, C. GOLLE & G. STEIN.
SHUTTLE PICKING MECHANISM FOR LOOMS.

No. 524,571. Patented Aug. 14, 1894.

WITNESSES
F. D. Goodwin
William X. Barr

INVENTORS
Morris T. Bartelt
Charles Golle
Gustave Stein
By his Attorneys
Howson & Howson

THE NORRIS PETERS CO., PHOTO-LITHO., WASHINGTON, D. C.

(No Model.) 3 Sheets—Sheet 3.

M. T. BARTELT, C. GOLLE & G. STEIN.
SHUTTLE PICKING MECHANISM FOR LOOMS.

No. 524,571. Patented Aug. 14, 1894.

WITNESSES

INVENTORS
Morris T. Bartelt
Charles Golle
Gustave Stein
By their Attorneys

UNITED STATES PATENT OFFICE.

MORRIS T. BARTELT, CHARLES GOLLE, AND GUSTAVE STEIN, OF PHILADELPHIA, PENNSYLVANIA.

SHUTTLE-PICKING MECHANISM FOR LOOMS.

SPECIFICATION forming part of Letters Patent No. 524,571, dated August 14, 1894.

Application filed February 13, 1894. Serial No. 500,026. (No model.)

*To all whom it may concern:*

Be it known that we, MORRIS T. BARTELT, CHARLES GOLLE, and GUSTAVE STEIN, all citizens of the United States, and residents of Philadelphia, Pennsylvania, have invented certain Improvements in Shuttle - Picking Mechanism for Looms, of which the following is a specification.

The object of our invention is to so construct the sweep or rod which connects the picking stick of a loom with the picker arm on the vibrating shaft, and to so connect the picker arm shaft to the stopping mechanism of the loom, that the connection between said picking arm and the picker stick will be automatically released and the stoppage of the loom effected in case the movement of the picker stick meets with any undue obstruction such as might be caused by the sticking of the shuttle, or failure of the same to properly leave the box. This object we attain in the manner hereinafter set forth, reference being had to the accompanying drawings, in which—

Figure 3:
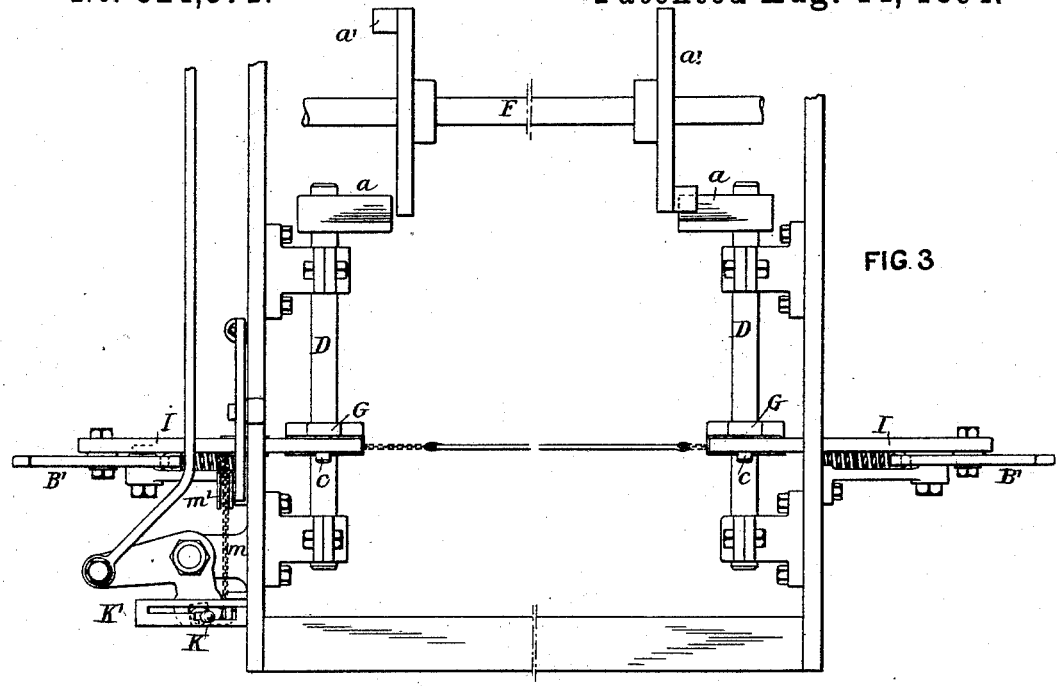
Figure 1:
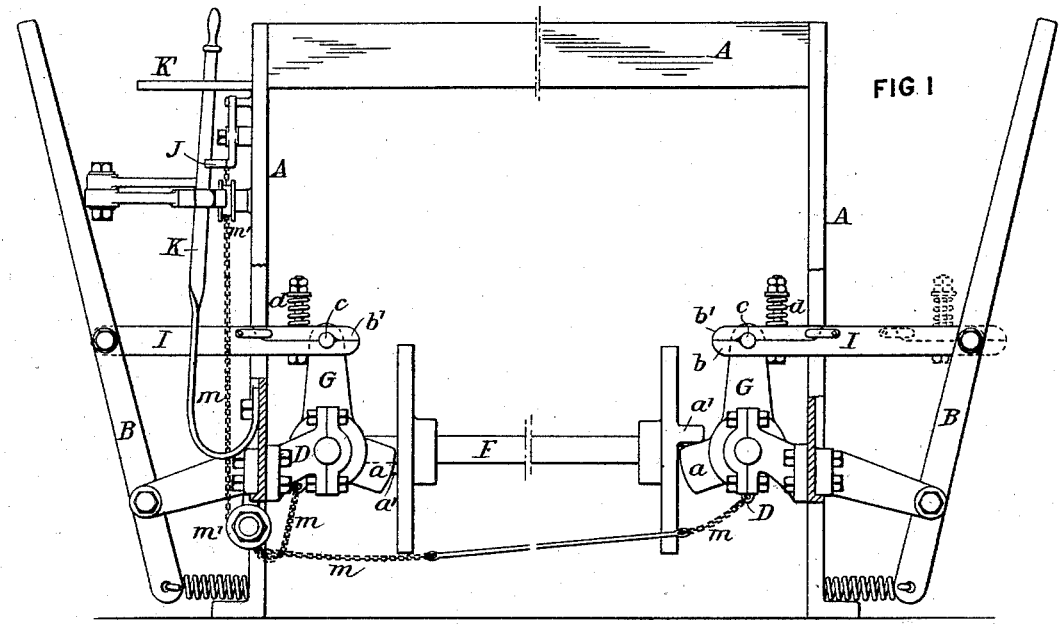
Figure 4:
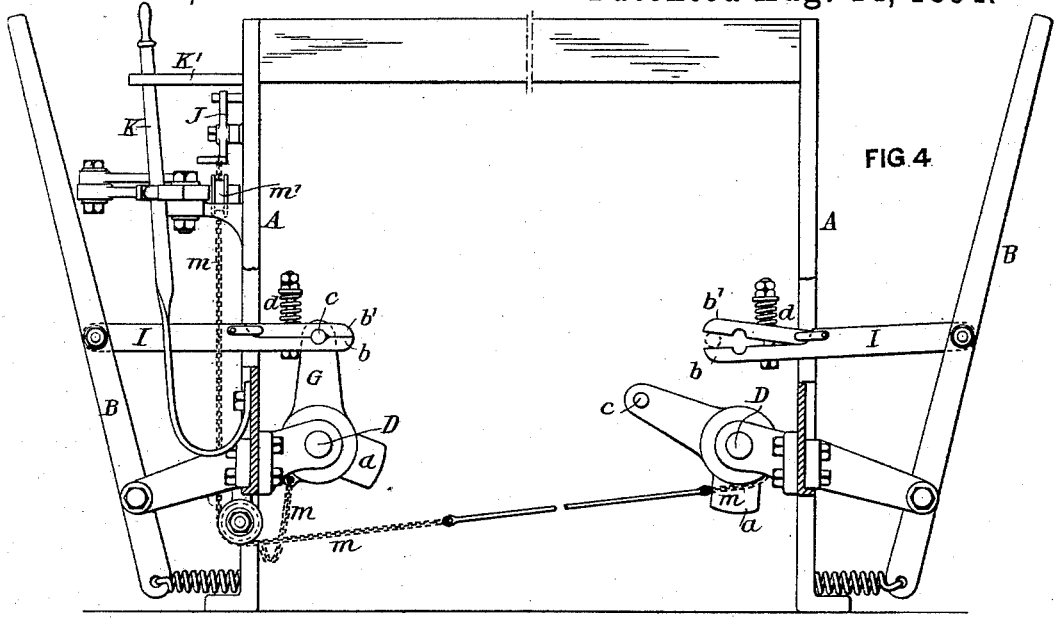
Figure 2:
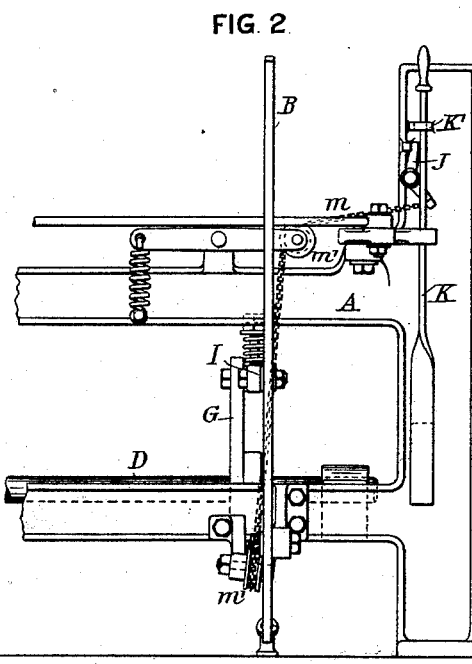
Figure 5:
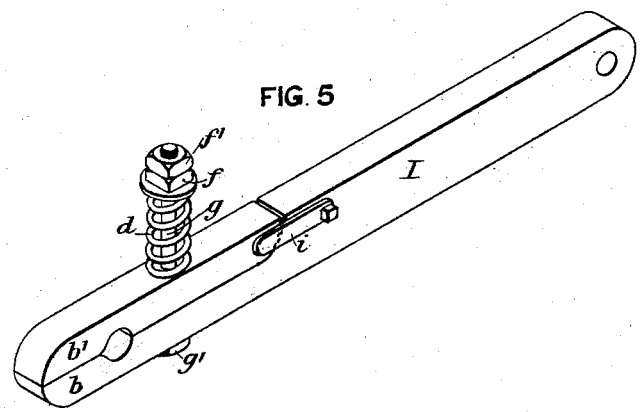
Figure 6:
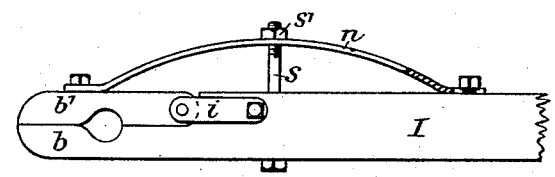
Figure 7:
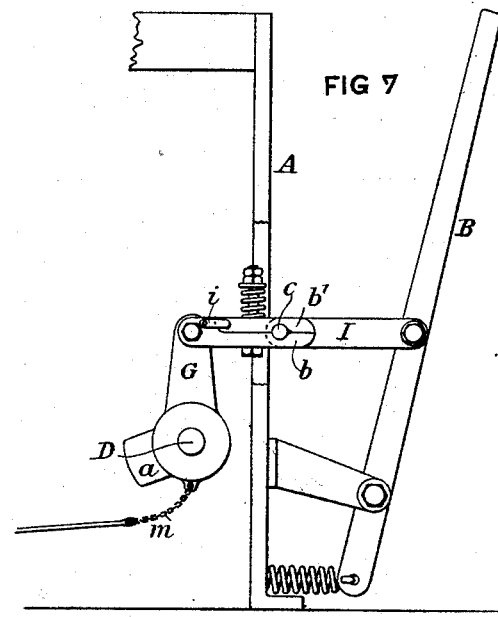

Figure 1, is a front view partly in section of sufficient of a loom to illustrate our present invention. Fig. 2, is a side view. Fig. 3, is a plan view. Fig. 4, is a front view illustrating the operation of the device. Fig. 5, is a perspective view of our improved form of picker sweep. Fig. 6, is a view illustrating a modified form of sweep embodying our invention, and Fig. 7, is a view illustrating a further modification.

A represents part of the frame of a loom, B B the picker sticks pivoted at their lower ends, and D D the rock shafts mounted in bearings on the frame of the loom and each having a projecting toe $a$ to be acted upon by a cam $a'$ on the shaft F of the loom, each rock shaft having a picker arm G which is connected to one of the picker sticks by means of the rod or sweep I.

It occasionally happens that the shuttle is prevented from properly leaving the box on the inward stroke of the picker stick and if there is an unyielding connection between the arm G and the picker stick, injury to the shuttle or to some of the other parts of the loom is likely to result. In order to overcome this objection we split the inner end of the picker sweep I so as to form the pair of jaws $b\ b'$ for embracing the pin $c$ on the picker arm G, the jaws being normally held together by means of a spring $d$ interposed between the jaw $b'$ and a nut $f$ applied to the upper portion of the bolt $g$ which passes through openings in the jaws $b\ b'$ of the sweep and has a head $g'$ bearing upon said jaw $b$, a lock nut $f'$ being, if desired, employed to prevent loosening of the nut $f$ after the same has been so adjusted as to impart the proper degree of tension to the spring $d$.

The inner end of the jaw $b'$ is held in place laterally by the wing plates $i$ secured to the body of the sweep and projecting inwardly so as to flank the outer portion of the jaw $b'$ which is otherwise unconfined, although it may if desired be pivoted, as for instance by means of a pin such as shown in Fig. 6.

So long as the movement of the picker stick meets with no undue resistance, the jaws $b\ b'$ embrace the pin $c$ of the picker arm and the movement of the latter is transmitted to the picker stick, but as soon as the proper movement of said picker stick is interfered with, the pressure of the pin $c$ upon the beveled outer portions of the jaws $b\ b'$ causes the spreading apart of said jaws so as to permit the pin to leave the opening in the jaws as shown in Fig. 4, the connection between the picker sweep and picker arm being thus self-releasing so that no injury to any part of the loom will result from obstruction to the movement of the picker stick. It is advisable, at the same time to stop the operation of the loom, until the cause of the obstruction can be ascertained and remedied, hence we connect to each rock shaft D by means of the hubs of the arms G or some other suitable connection, one end of a chain or cord $m$, which passes over suitable guide pulleys $m'$ and is connected at the opposite end to a tripper J, hung to the frame of the loom, and adapted to act upon the knock off arm K, so that excessive movement of either shaft D, such as will be permitted when the pin $c$ of its arm G leaves the jaws of the picker sweep, will cause such a pull upon the cord or chain $m$ as will result in dislodging the upper end of the knock-off arm K from the notch in the retaining plate K', and will thus permit said knock-off arm to shift the driving belt, through the medium of the usual connections, and thereby stop the operation of the loom. After the trouble has been remedied and before again starting the loom, the arm G is lifted until its pin c can again enter the jaws of the picker sweep.

Although we prefer in carrying out our invention to use the form of sweep which we have illustrated in Figs. 1 to 5, other forms of sweep can be used, for instance, in Fig. 6 we have shown a sweep in which the loose jaw $b'$ is carried by the outer end of a plate spring $n$ so that it is free to rise when undue pressure is exerted upon it, a bolt $s$ and nut $s'$ being, if desired, employed to regulate the tension of this spring. It will be evident also that the jaws may be formed at either end of the sweep so as to embrace either the pin $c$ or the pin on the picker stick, or such jaws may be formed at both ends of the sweep if desired, (see dotted lines Fig. 1) and the arrangement of pins and jaws may, if desired, be reversed, that is to say, the pins may be secured to the sweep, and the jaws may be hung to the picker stick or picker arm, the latter construction being shown in Fig. 7.

Having thus described our invention, we claim and desire to secure by Letters Patent—

The combination of the picker arm and picker stick, means for vibrating said arm, a rod or sweep connecting the arm and stick, and having a spring jaw, whereby it is self-releasing when subjected to undue strain, the knock-off arm, and tripping mechanism interposed between said knock-off arm and the shaft of the picker arm, whereby said knock-off arm is released on any excessive movement of the picker arm, substantially as specified.

In testimony whereof we have signed our names to this specification in the presence of two subscribing witnesses.

MORRIS T. BARTELT.
CHAS. GOLLE.
GUSTAVE STEIN.

Witnesses:
H. J. KUHN,
ALFRED BENKLER.